United States Patent
Hummel et al.

(10) Patent No.: US 10,380,468 B2
(45) Date of Patent: Aug. 13, 2019

(54) PROACTIVE TRANSMISSION OF MEASURED VALUES TO MOBILE DEVICES

(71) Applicant: VEGA GRIESHABER KG, Wolfach (DE)

(72) Inventors: Jakob Hummel, Elzach (DE); Marcel Dieterle, Oberwolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 29 days.

(21) Appl. No.: 15/423,263

(22) Filed: Feb. 2, 2017

(65) Prior Publication Data
US 2017/0223435 A1 Aug. 3, 2017

(30) Foreign Application Priority Data

Feb. 2, 2016 (EP) ..................................... 16153935

(51) Int. Cl.
*G06K 19/06* (2006.01)
*G06F 3/14* (2006.01)
*G08C 17/02* (2006.01)
*G08C 19/16* (2006.01)
*H04B 1/3827* (2015.01)
*G05B 19/00* (2006.01)
*H04Q 9/00* (2006.01)
(Continued)

(52) U.S. Cl.
CPC ....... *G06K 19/06009* (2013.01); *G05B 19/00* (2013.01); *G05B 19/0428* (2013.01); *G05B 19/4063* (2013.01); *G06F 3/14* (2013.01); *G08C 17/02* (2013.01); *G08C 19/16* (2013.01); *H04B 1/385* (2013.01); *H04Q 9/00* (2013.01); *G05B 2219/23084* (2013.01); *G05B 2219/25062* (2013.01); *G08C 2201/93* (2013.01); *H04Q 2209/40* (2013.01); *H04Q 2209/50* (2013.01)

(58) Field of Classification Search
CPC ........................... G06K 19/06009; H01Q 1/24
USPC ....................................................... 455/414.1
See application file for complete search history.

(56) References Cited

U.S. PATENT DOCUMENTS 5,883,337 A * 3/1999 Dolan .................. G01G 19/047
177/163
6,073,169 A * 6/2000 Shuey .................... G01D 4/004
340/870.02
(Continued)

FOREIGN PATENT DOCUMENTS

CN           1804744 A      7/2006
CN         101387882 A      3/2009
(Continued)

OTHER PUBLICATIONS

Francis,Christopher, Ptab upholds indefiniteness rejection of inferentially claimed element. https://www.b2ipreport.com/claims-interpreted/ptab-upholds-indefiniteness-rejection-of-inferentially-claimed-element/ (Year: 2018).*

(Continued)

*Primary Examiner* — Albert K Wong
(74) *Attorney, Agent, or Firm* — Oblon, McClelland, Maier & Neustadt, L.L.P.

(57) ABSTRACT

A mobile display device that selects a particular field device from a group of field devices and retrieves measurement data therefrom. The field device is selected by evaluating environment data which are captured by the display device without user input simplifying the measurement data display.

9 Claims, 1 Drawing Sheet

(51) Int. Cl.
  *G05B 19/042*  (2006.01)
  *G05B 19/4063*  (2006.01)

(56) References Cited

U.S. PATENT DOCUMENTS

| | | | |
|---|---|---|---|
| 6,718,215 B2 | 4/2004 | Friedrich et al. | |
| 9,549,052 B2* | 1/2017 | Pinapala Venkata | ........................ H04M 1/72522 |
| 9,778,626 B2* | 10/2017 | Nixon | .................. G06F 3/04842 |
| 9,892,473 B1* | 2/2018 | Garner | .................... G06Q 50/06 |
| 2005/0164684 A1 | 7/2005 | Chen et al. | |
| 2008/0150751 A1* | 6/2008 | Sala | .......................... G01D 4/00 340/870.02 |
| 2008/0183599 A1* | 7/2008 | Hill | ...................... G06Q 10/087 705/28 |
| 2008/0299915 A1* | 12/2008 | Fink | ....................... G08C 17/02 455/90.1 |
| 2009/0030950 A1 | 1/2009 | Maneval et al. | |
| 2009/0065578 A1 | 3/2009 | Peterson et al. | |
| 2014/0089501 A1 | 3/2014 | Hoferlin et al. | |
| 2014/0167978 A1* | 6/2014 | Popa | ...................... G01D 4/006 340/870.02 |
| 2014/0282257 A1* | 9/2014 | Nixon | .................... G05B 11/01 715/835 |
| 2015/0018006 A1* | 1/2015 | Pollmann | ............ H04L 61/2038 455/456.1 |
| 2016/0132046 A1* | 5/2016 | Beoughter | ........ G06F 17/30554 700/17 |

FOREIGN PATENT DOCUMENTS

| | | |
|---|---|---|
| CN | 102356366 A | 2/2012 |
| CN | 104049585 A | 9/2014 |
| DE | 199 00 884 A1 | 7/2000 |
| DE | 10 2012 108 990 A1 | 5/2014 |
| DE | 10 2013 016 096 A1 | 4/2015 |

OTHER PUBLICATIONS

Office Action and Search Report dated Mar. 27, 2019, in China Office Action No. 201710025061.7 (7 pgs.).

\* cited by examiner

PROACTIVE TRANSMISSION OF MEASURED VALUES TO MOBILE DEVICES

REFERENCE TO RELATED APPLICATIONS

This application claims the benefit of the filing date of European Patent Application No. 16 153 935.8 filed on 2 Feb. 2016, the disclosure of which is hereby incorporated herein by reference.

FIELD OF THE INVENTION

The invention relates to the transmission and display of field device measurement data. In particular, the invention relates to a mobile display device for selecting a field device from a group of field devices and for retrieving measurement data from the field device, to a measurement arrangement comprising a group of field devices and a mobile display device, to a method for selecting a field device from a group of field devices and for retrieving measurement data from the field device, to a program element and to a computer-readable medium.

TECHNICAL BACKGROUND

Measurement data is retrieved from the field devices for example via a web server to which the user connects. This web server is communicatively connected to the field devices and obtains the measurement data therefrom. Alternatively, a user can also obtain the measurement data directly from the field device by connecting a display and control module or communication module, for example, to the field device.

SUMMARY

A first aspect of the invention relates to a mobile display device for selecting a field device from a group of field devices and for retrieving measurement data from the field device. The display device comprises a sensor arrangement, a processing unit and a communication unit.

The sensor arrangement is used to capture environment data which are associated with the location of the field device or with the container on which the field device is mounted or to which the field device is assigned. If the field device is a fill level measurement device, this container is used for storing the filling material of which the fill level is to be measured.

The processing unit is used to analyse the environment data and to identify and/or select the field device on the basis of the analysis of the environment data. In other words, the processing unit can determine from the environment data captured by the sensor arrangement which field device from the group of field devices is to be selected. This can be made possible by the display device accessing a data set which contains information about which field device is mounted on which container. It should be noted that the analysis of the environment data and/or the determination of the field device may also be performed by an external server which communicates with the mobile display device.

For example, it can be provided that the field device or container which is located closest to the mobile display device is selected and/or the field device or container towards which the mobile display device is directed is selected.

A digital map may be stored on the server and/or mobile display device such that the container towards which the mobile display device is directed can be selected automatically. An image analysis is not required. Geometrical or visual features of the container may also be recorded in this digital map, and therefore the server or the mobile display device can identify the container to which the mobile display device is directed using the captured image of the container. A barcode on the container or an identification number is not required. In particular, the respective container positions and the identification numbers of the field devices mounted on said container can be recorded in the digital map.

The mobile display device comprises a position sensor, for example, and so it may be determined at any time where the mobile display device is located relative to the containers.

It may be provided that these calculations take place on the server side and the server ensures that the appropriate field device is selected.

The communication unit is used for retrieving measurement data from the field device which has been identified and selected. Measurement data can be retrieved automatically without the user needing to intervene or having to select a field device. Which field device is to be selected by the display device is determined solely by the captured environment data, and as a result of this the measurement data are retrieved automatically from the field device or server. However, it can also be provided that these measurement data are already retrieved at an earlier point in time so that they are already available in the display device after the field device has been selected.

Therefore, the user can move through a warehouse, for example, in which a plurality of tanks are stored, each of these tanks having its own fill level measurement device. As the user walks through the warehouse, only the closest field device and/or the closest tank and the currently measured fill level therein are displayed to him in each case, for example.

It should be noted at this point that the field device may be a fill level measurement device, but it may also be a pressure gauge or flow measuring instrument, or some other field device. The invention offers particular advantages for cases where a plurality of field devices are arranged at different locations, since this makes it possible for the user to get measurement data of interest to him displayed automatically without him needing to select a field device himself or having to trigger the measurement data retrieval.

According to an embodiment of the invention, the mobile display device is designed to automatically retrieve the measurement data directly at the field device.

According to another embodiment of the invention, the mobile display device is designed to automatically retrieve the measurement data on a server.

The communication between the mobile display device and the field device or the server is generally wireless.

According to another embodiment of the invention, the environment data include position data sent from the field device, orientation data of the mobile display device, image data of the container and/or barcode data or QR code data of a label affixed to the container.

By evaluating these environment data, it is thus possible to identify the container (for example by image analysis of the recorded container image or by reading the barcode, etc.). It is also possible that the identity of the field device can be deduced from the position data sent by the field device, since the mobile display device has stored the positions and identities of the field devices in a digital map. In addition, the distance of the field device from the mobile display device can be determined from the sent position data, at least when the mobile display device comprises its own position sensor (for example a GPS sensor).

The environment data can also contain height information, from which it can be determined at what height the user is located. From this height information, it can be for example inferred on what tank he is standing at that moment and an assignment of the closest field device can thus take place. The information relating to the environment can also contain information about the air pressure, from which the height can be derived, for example. Said information relating to the environment can also contain information relating to data received from the field device(s), transmission signal frequencies or transmitting powers, from which the transmitted field device and/or the distance thereof from the display device can be inferred. If, for example, the field device uses short-range communication such as Bluetooth, radio signals will only be received from the field device which is in close proximity (typically less than 30 m) to the display device.

According to another embodiment of the invention, the mobile display device is a pair of smart glasses, a head-mounted display, a smartphone, a tablet or another type of mobile computer. It can be provided that the data from the field device that is of interest to the user is always depicted on his display for the field device which he is facing at that moment. As well as fill level data, it can also be provided that the position of the field device and/or the tank is shown on the display so that the user knows which tank it is. It can also be provided that the level of the tank can be depicted on the display, for example in the form of a coloured line or a rectangle which simulates the liquid in the container. In this way, the user can very quickly obtain an impression of the fill level situation in all the containers by turning his head, since this information can be superimposed graphically on the actual container.

According to another aspect of the invention, a measurement arrangement for capturing and outputting measurement data is provided which comprises a group of field devices arranged at different locations and a mobile display device that is described above and in the following. The field devices are designed to transmit environment data, in particular position data, to the mobile display device, and the mobile display device is designed to select one of the field devices by using the environment data.

The user himself therefore does not have to make a selection. Instead, the measurement data from the selected field device is transmitted to him automatically on the display device.

Another aspect of the invention relates to a method for selecting a field device from a group of field devices and for retrieving measurement data from the field device, in which initially environment data are captured which are associated with the location of the container on which the field device is mounted. The environment data is then analysed, and subsequently the field device is identified and selected on the basis of the analysis. At the same time, before or after the field device has been identified and selected, the field device measurement data is automatically retrieved. This can all be in a computer-assisted manner without the user needing to intervene. After the field device has been selected, the measurement data thereof are displayed on a display. It can be provided that no measurement data are displayed other than the data from the selected field device.

A further aspect of the invention relates to a program element which, when executed on a processor of a mobile display device, instructs the display device to carry out the steps described above and in the following.

Another aspect of the invention relates to a computer-readable medium, on which the above-described program element is stored.

In this case, the program element can be part of a piece of software, for example, that is stored on a processor of the mobile display device. The program element can also be a program element which, by way of an update, instructs an existing program to use the invention.

In the following, embodiments of the invention will be described with reference to the figures.

DETAILED DESCRIPTION OF EMBODIMENTS

Figure 1:
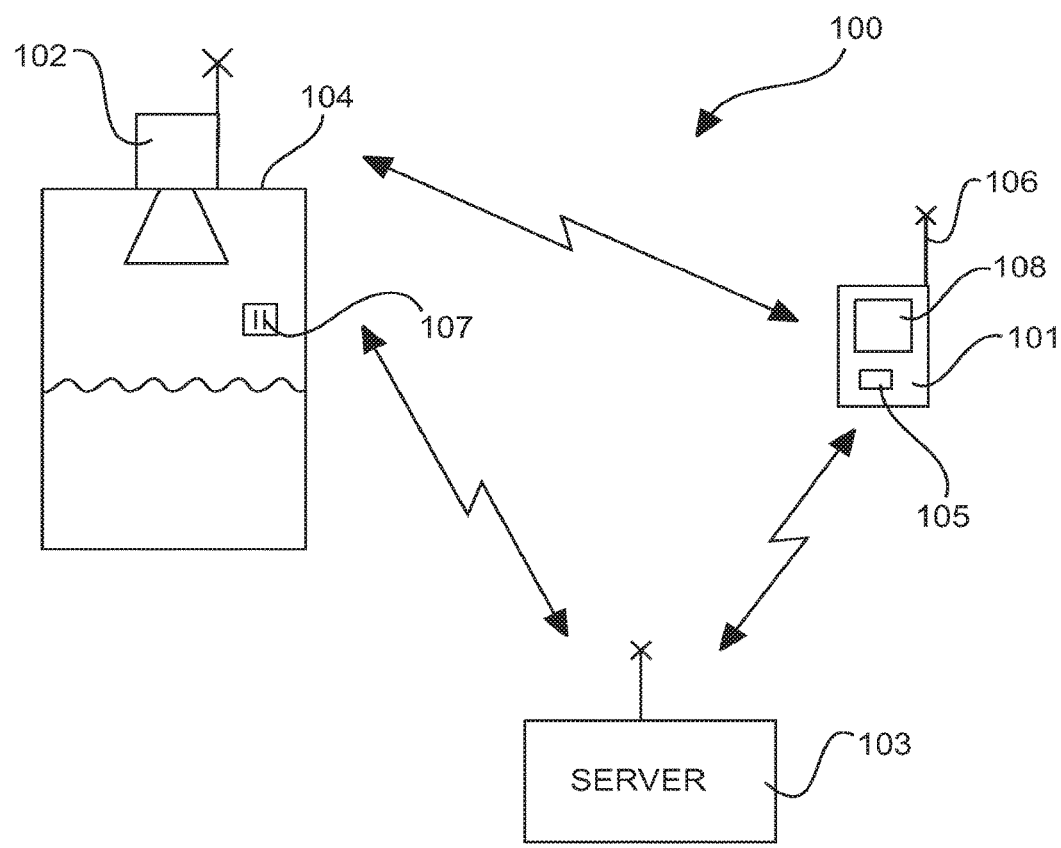
FIG. 1 shows a measurement arrangement according to an embodiment of the invention.

The views in the drawings are schematic and not to scale.

FIG. 1 shows a measurement arrangement 100 according to an embodiment of the invention. The measurement arrangement comprises a plurality of filling material containers or tanks 104, of which only one is shown for reasons of clarity. In each tank, a fill level measurement device 102 is fitted which can determine the fill level of the filling material stored in the container. However, a tank and fill level measurement device are only one embodiment. As well as a fill level measurement device, the field device can also be another sensor, for example a pressure sensor or a flow sensor.

A label 107 is affixed to the tank, on which label a barcode or QR code is depicted.

The system 100 further comprises a web server 103 and a mobile display device 101. The web server, display device and field device can communicate with one another wirelessly. In this way, the field device 102 can transmit measurement data to the server or web server 103, which measurement data are then called up from the server by the display device 101. It can also be provided that the field device directly transmits measurement data to the display device.

For this purpose, the display device comprises an antenna 106 which can also act as a sensor in order to capture environment data. The processing unit 105 of the display device evaluates the captured environment data and then optionally triggers a measurement data request to the server and/or the field device. However, the measurement data may also have been made available previously. The measurement data received can then be displayed on the display 108. More particularly, this display is triggered by the evaluation of the environment data.

The field device 102 of which the data is intended to be retrieved and displayed is therefore selected by analysing the environment data captured by the display device.

The display device 106 is, for example, a smartphone, a tablet, a watch, a pair of smart glasses, a "HoloLens", a wristband, a head-mounted display or a "wearable".

The display device is capable of proactively selecting the relevant field device, as a result of which automatic transmission of the relevant measurement data is triggered. This selection is made using the captured environment data.

The measured values from the field device 102 are transmitted continuously, for example, to the web server 103. If the user enters the tank farm in which the container 104 is located, the tanks relevant to the user are identified using the environment data captured by the display device and the measurement data is subsequently (or even before the user has entered the tank farm) loaded on the user's display device. If the user approaches a particular tank/plurality of tanks, the fill level data, for example, is displayed on his display device; which tank(s) he is approaching can be identified by the environment data. The fill level data are displayed to the user without manual selection, and therefore maximum user convenience is ensured.

The display device is capable of capturing a plurality of different environment data, for example position data of the field devices and/or the display device itself, the height at which the display device is located, the three-dimensional angle of inclination of the display device, which shows the direction in which the display device points, the air pressure, radio reception of particular data or frequencies of the field device and/or visual identification features such as barcode/QR code or tank view.

By way of example, the display device can be programmed to always display the field device that is located closest to the mobile display device, or the latest current measurement data thereof. Another option for identifying the field device in which the user could be interested at a specific time is that of measuring the height at which the user is positioned. If all containers in the space have a different height, the corresponding container and thus also the field device can be identified by means of the measured height information. The measurement data currently measured by the field device are subsequently displayed on the display device.

Figure 2:
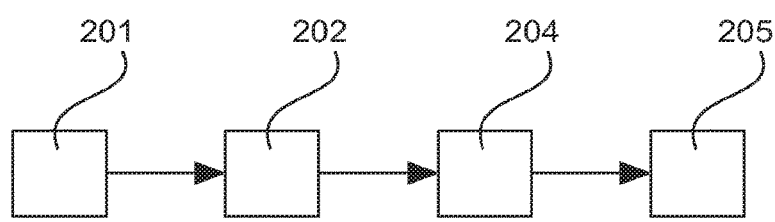
FIG. 2 is a flow diagram of a method according to an embodiment of the invention.

FIG. 2 shows a flow diagram of a method according to an embodiment of the invention. In step 201, environment data are captured which are associated with the location of a container on which the field device is mounted. In step 202, the captured environment data are analysed. As an intermediate result of this analysis, it is determined that three containers are located in the angle of vision of the user (or of the smart glasses worn by the user). In step 204, the container which is closest to the user (or the mobile display device thereof) is selected from among these three containers and, in step 205, the measurement data captured most recently by said measurement device are shown on the display device.

At any time during the method, the measurement data from all of the field devices or at least the selected field device can be retrieved and loaded onto the display device (either directly from the field device or via the server), and therefore said data can be displayed as promptly as possible. This is then particularly advantageous when the user rapidly changes his line of vision or the orientation of his wearable device or moves quickly through the space, meaning that different tanks must be selected and thus different fill levels must be displayed relatively quickly one after the other.

For the sake of completeness, it should be noted that "comprising" and "having" do not exclude the possibility of other elements or steps, and the indefinite articles "an" or "a" do not exclude the possibility of a plurality. It should further be noted that features or steps which have been described with reference to one of the above embodiments may also be used in combination with other features or steps of other above-described embodiments. Reference numerals in the claims should not be treated as limiting.

The invention claimed is:

1. A mobile display device for selecting a field device and for retrieving measurement data from the field device, the mobile display device comprising:

a first sensor configured to capture orientation data of the mobile display device;

a second sensor configured to capture image data of a container to which the field device is mounted;

a position sensor configured to capture a position of the mobile display device;

processing circuitry configured to analyse the orientation data and the position of the mobile display device, to identify the container on the basis of the analysis, and, using the identity of the container, to subsequently identify and select the field device; and communication circuitry configured to retrieve measurement data from the selected field device, wherein the mobile display device is configured to display the measurement data from the selected field device.

2. The mobile display device according to claim 1, wherein the mobile display device is configured to automatically retrieve measurement data directly at the selected field device.

3. The mobile display device according to claim 1, wherein the mobile display device is configured to automatically retrieve the measurement data on a server.

4. The mobile display device according to claim 1, wherein the selected field device is a fill level measurement device, a density measuring device, or a pressure gauge.

5. The mobile display device according to claim 1, wherein the mobile display device is a pair of smart glasses or a head-mounted display.

6. A server comprising:

processing circuitry configured to connect to a field device and a display device, wherein the display device is the mobile display device according to claim 1.

7. A measurement arrangement for capturing and outputting measurement data, comprising:

one or more field devices; and the mobile display device according to claim 1, wherein the one or more field devices are configured to transmit environment data, including position data, to the mobile display device, and wherein the mobile display device is configured to select one of the one or more field devices using the environment data.

8. A method for selecting a field device and for retrieving measurement data from a field device, comprising:

capturing orientation data of a mobile display device, image data of a container to which the field device is mounted, and a position of the mobile display device;

analysing the orientation data and the position of the mobile display device;

identifying the container on the basis of the analysis;

identifying and selecting the field device, using the identity of the container;

retrieving measurement data from the selected field device;

associating the retrieved data to the identified field device; and displaying the measurement data from the selected field device.

9. A computer-readable storage medium having stored thereon a program element that when executed by a computer causes the computer to execute a method for selecting a field device and for retrieving measurement data from a field device, comprising:

capturing orientation data of a mobile display device, image data of a container to which the field device is mounted, and a position of the mobile display device;

analysing the orientation data and the position of the mobile display device;

identifying the container on the basis of the analysis;

identifying and selecting the field device, using the identity of the container;

retrieving measurement data from the selected field device;

associating the retrieved data to the identified field device; and displaying the measurement data from the selected field device.

* * * * *